United States Patent
Stephenne

(10) Patent No.: US 11,438,915 B2
(45) Date of Patent: Sep. 6, 2022

(54) SDMA CARRIER SHARING

(71) Applicant: Telefonaktiebolaget LM Ericsson (publ), Stockholm (SE)

(72) Inventor: Alex Stephenne, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/973,126

(22) PCT Filed: Jun. 8, 2018

(86) PCT No.: PCT/IB2018/054172
§ 371 (c)(1),
(2) Date: Dec. 8, 2020

(87) PCT Pub. No.: WO2019/234478
PCT Pub. Date: Dec. 12, 2019

(65) Prior Publication Data
US 2021/0258977 A1    Aug. 19, 2021

(51) Int. Cl.
| | |
|---|---|
| H04W 72/12 | (2009.01) |
| H04W 76/15 | (2018.01) |
| H04B 7/0452 | (2017.01) |
| H04W 16/14 | (2009.01) |
| H04W 72/04 | (2009.01) |
| H04W 88/06 | (2009.01) |

(52) U.S. Cl.
CPC ...... *H04W 72/1215* (2013.01); *H04B 7/0452* (2013.01); *H04W 16/14* (2013.01); *H04W 72/044* (2013.01); *H04W 76/15* (2018.02); *H04W 88/06* (2013.01)

(58) Field of Classification Search
CPC ............ H04W 72/1215; H04W 88/06; H04W 76/15; H04W 16/14
See application file for complete search history.

(56) References Cited

U.S. PATENT DOCUMENTS

| | | | | |
|---|---|---|---|---|
| 9,479,236 | B2* | 10/2016 | Ariyavisitakul | H04L 25/03942 |
| 10,021,572 | B2* | 7/2018 | Ericson | H04W 72/1215 |
| 10,932,283 | B2* | 2/2021 | Mukherjee | H04L 5/0042 |
| 11,044,693 | B1* | 6/2021 | Gummadi | H04W 64/003 |
| 2011/0249660 | A1* | 10/2011 | Noh | H04L 5/005 |
| | | | | 370/338 |
| 2011/0271168 | A1* | 11/2011 | Han | H04L 1/0027 |
| | | | | 714/807 |
| 2012/0027005 | A1* | 2/2012 | Haustein | H04B 7/0617 |
| | | | | 370/344 |

(Continued)

OTHER PUBLICATIONS

Lagen, Sandra, et al., "Paired Listen Before Talk for multi-RAT Coexistence in Unlicensed mmWave Bands," IEEE International Conference on Communications Workshops (ICC Workshops), Kansas City, MO, 2018, pp. 1-6.

(Continued)

*Primary Examiner* — Parth Patel
(74) *Attorney, Agent, or Firm* — Withrow & Terranova, PLLC

(57) ABSTRACT

Systems and methods are disclosed herein for scheduling wireless communication devices in a wireless communication system in accordance with a carrier or spectrum sharing scheme that utilizes spatial multiplexing across Radio Access Technologies (RATs).

12 Claims, 9 Drawing Sheets

FIRST SET OF TIME-FREQUENCY RESOURCES

SECOND SET OF TIME-FREQUENCY RESOURCES

(56) References Cited

U.S. PATENT DOCUMENTS

| | | | |
|---|---|---|---|
| 2012/0120884 A1* | 5/2012 | Yu | H04B 7/0452 370/329 |
| 2012/0230443 A1* | 9/2012 | Seok | H04B 7/0456 375/260 |
| 2012/0294255 A1* | 11/2012 | Seok | H04B 7/0452 370/329 |
| 2013/0070722 A1* | 3/2013 | Li | H04L 5/0053 370/329 |
| 2013/0210447 A1* | 8/2013 | Moe | H04W 28/16 455/453 |
| 2013/0301601 A1* | 11/2013 | Takano | H04W 72/042 370/329 |
| 2014/0050277 A1* | 2/2014 | Wu | H04B 7/0639 375/267 |
| 2014/0185564 A1* | 7/2014 | Dong | H04W 72/046 370/329 |
| 2014/0286170 A1* | 9/2014 | Ericson | H04W 16/14 370/235 |
| 2014/0335883 A1* | 11/2014 | Ericson | H04L 5/0048 455/452.2 |
| 2015/0023270 A1* | 1/2015 | Park | H04L 5/0048 370/329 |
| 2015/0382224 A1* | 12/2015 | Himayat | H04B 7/0626 370/332 |
| 2016/0073398 A1* | 3/2016 | Batchu | H04W 56/0015 455/424 |
| 2016/0242147 A1* | 8/2016 | Tarlazzi | H04W 72/04 |
| 2016/0295630 A1* | 10/2016 | Gubeskys | H04L 5/0055 |
| 2017/0013472 A1* | 1/2017 | Wang | H04L 5/0048 |
| 2017/0034706 A1* | 2/2017 | Ericson | H04W 72/1215 |
| 2017/0142592 A1* | 5/2017 | Fischer | H04W 72/1263 |
| 2017/0366243 A1* | 12/2017 | Xiao | H04L 5/0048 |
| 2018/0160334 A1* | 6/2018 | Deshpande | H04W 36/22 |
| 2019/0013881 A1* | 1/2019 | Olesen | H04W 16/14 |
| 2019/0014616 A1* | 1/2019 | Martin | H04W 28/021 |
| 2019/0124589 A1* | 4/2019 | Bogineni | H04W 48/18 |
| 2019/0230485 A1* | 7/2019 | Hahn | H04W 72/0486 |
| 2019/0268801 A1* | 8/2019 | Wang | H04L 47/30 |
| 2019/0372631 A1* | 12/2019 | Taira | H04B 7/043 |
| 2021/0099976 A1* | 4/2021 | Mueck | H04W 72/04 |
| 2021/0234580 A1* | 7/2021 | El-Keyi | H04B 7/0452 |
| 2021/0243609 A1* | 8/2021 | Lei | H04W 16/14 |
| 2021/0258977 A1* | 8/2021 | Stephenne | H04B 7/0452 |
| 2021/0266753 A1* | 8/2021 | Kumar | H04W 28/0819 |

OTHER PUBLICATIONS

International Search Report and Written Opinion for International Patent Application No. PCT/IB2018/054172, dated Feb. 4, 2019, 17 pages.

\* cited by examiner

FIRST SET OF TIME-FREQUENCY RESOURCES

SECOND SET OF TIME-FREQUENCY RESOURCES

SDMA CARRIER SHARING

This application is a 35 U.S.C. § 371 national phase filing of International Application No. PCT/IB2018/054172, filed Jun. 8, 2018, the disclosure of which is incorporated herein by reference in its entirety.

TECHNICAL FIELD

The present disclosure relates to spectrum sharing between different Radio Access Technologies (RATs).

BACKGROUND

Some existing cellular communications systems allow at least two Radio Access Technologies (RATs) to be multiplexed in time and/or frequency over a single carrier or frequency band. As an example, there are existing cellular communications systems in which Long Term Evolution (LTE) and Global System for Mobile communications (GSM) resources can be multiplexed in frequency over a given carrier. Such multiplexing allows the gradual migration of spectrum from one RAT to another or allows a legacy RAT to still be supported without having to dedicate the full carrier bandwidth to that RAT. While these existing cellular communications systems work well when sharing a single carrier or frequency band between two or more RATs, they are less than optimal when one of those RATs in a Fifth Generation (5G) RAT.

SUMMARY

Systems and methods are disclosed herein for scheduling wireless communication devices in a wireless communication system in accordance with a carrier or spectrum sharing scheme that utilizes spatial multiplexing across Radio Access Technologies (RATs). In some embodiments, a method of operation of a scheduler to schedule wireless communication devices in a wireless communication system that provides radio access via a first RAT and a second RAT is provided. The method comprises obtaining first information comprising channel information regarding channels between a first plurality of wireless communication devices and at least one radio unit used by the first RAT, or scheduling information for the first RAT. The scheduling information for the first RAT comprises: (a) information that indicates one or more sets of time-frequency resources on which the first plurality of wireless communication devices are scheduled on the first RAT and (b) for each of the one or more sets of time-frequency resources, channel information regarding the channel between a respective wireless communication device scheduled on the set of time-frequency resources on the first RAT and at least one radio unit used by the first RAT. The method further comprises obtaining second information comprising channel information regarding channels between a second plurality of wireless communication devices and at least one radio unit used by a second RAT, and scheduling at least some of the plurality of wireless communication devices on the second RAT based on the first information and the second information in such a manner that multi-RAT Multiple-User Multiple Input Multiple Output (MU-MIMO) parings across the first and second RATs are considered. As used herein, a multi-RAT MU-MIMO pairing is two or more wireless communication devices on two or more different RATs that can be scheduled on a same set of time-frequency resources in the different RATs using different spatial multiplexing layers.

In some embodiments, the scheduler is a multi-RAT scheduler, and the first information comprises the channel information regarding the channels between the first plurality of wireless communication devices and at least one radio unit used by the first RAT. Further, obtaining the first information comprises obtaining, from a first RAT system, the channel information regarding the channels between the first plurality of wireless communication devices and at least one radio unit used by the first RAT. Obtaining the second information comprises obtaining, from a second RAT system, the channel information regarding the channels between the second plurality of wireless communication devices and at least one radio unit used by the second RAT. Still further, scheduling the at least some of the second plurality of wireless communication devices on the second RAT comprises jointly scheduling, at the multi-RAT scheduler, at least some of the first plurality of wireless communication devices on the first RAT and the at least some of the second plurality of wireless communication devices on the second RAT based on the first information and the second information in such a manner that multi-RAT MU-MIMO parings across the first and second RATs are considered.

In some embodiments, jointly scheduling the at least some of the first plurality of wireless communication devices on the first RAT and the at least some of the second plurality of wireless communication devices on the second RAT comprises identifying a multi-RAT MU-MIMO pairing comprising a first wireless communication device from among the first plurality of wireless communication devices and a second wireless communication device from among the second plurality of wireless communication devices based on the first information and the second information, and scheduling the at least some of the first plurality of wireless communication devices on the first RAT and the at least some of the second plurality of wireless communication devices on the second RAT such that the first wireless communication device and the second wireless communication device are scheduled on the same time-frequency resources using different spatial multiplexing layers on the first and second RATs, respectively.

In some embodiments, the method further comprises providing first scheduling information to the first RAT system, and providing second scheduling information to the second RAT system. The first scheduling information comprises information that indicates time-frequency resources scheduled for the at least some of the first plurality of wireless communication devices on the first RAT. The second scheduling information comprises information that indicates time-frequency resources scheduled for the at least some of the second plurality of wireless communication devices on the second RAT.

In some embodiments, the scheduler is a scheduler for the second RAT, and the first information comprises the scheduling information for the first RAT. Further, obtaining the first information comprises obtaining, from the first RAT system, the scheduling information for the first RAT. Obtaining the second information comprises obtaining, at the scheduler for the second RAT, the channel information regarding the channels between the second plurality of wireless communication devices and at least one radio unit used by the second RAT. Still further, scheduling the at least some of the plurality of wireless communication devices on the second RAT comprises scheduling, at the scheduler for the second RAT, the at least some of the second plurality of wireless communication devices on the second RAT based on the first information and the second information in such a manner that multi-RAT MU-MIMO parings across the first and second RATs are considered.

In some embodiments, scheduling the at least some of the second plurality of wireless communication devices on the second RAT comprises identifying a multi-RAT MU-MIMO pairing comprising a first wireless communication device from among the first plurality of wireless communication devices and a second wireless communication device from among the second plurality of wireless communication devices based on the first information and the second information, and scheduling the at least some of the second plurality of wireless communication devices on the second RAT such that the first wireless communication device and the second wireless communication device are scheduled on the same time-frequency resources using different spatial multiplexing layers on the first and second RATs, respectively.

In some embodiments, scheduling the at least some of the plurality of wireless communication devices on the second RAT comprises scheduling the at least some of the plurality of wireless communication devices on the second RAT based on the first information and the second information in such a manner that both: multi-RAT MU-MIMO parings across the first and second RATs are considered and multi-RAT Single-User Multiple Input Multiple Output (SU-MIMO) operation for a single wireless communication device across the first and second RATs is considered.

In some embodiments, for each wireless communication device of the first plurality of wireless communication devices and the second plurality of wireless communication devices, the channel information for the wireless communication device comprises information that indicates an angular distribution of power of the channel between the wireless communication device and at least one radio unit used by the respective RAT.

In some embodiments, for each wireless communication device of the first plurality of wireless communication devices and the second plurality of wireless communication devices, the channel information for the wireless communication device comprises a channel estimate vector for the channel between the wireless communication device and at least one radio unit used by the respective RAT.

In some embodiments, the method further comprises obtaining, for each wireless communication device of the first plurality of wireless communication devices, first precoder information regarding a transmit or receiver precoder used for the wireless communication device on the first RAT, and obtaining, for each wireless communication device of the second plurality of wireless communication devices, second precoder information regarding a transmit or receiver precoder used for the wireless communication device on the second RAT. Further, scheduling the at least some of the second plurality of wireless communication devices on the second RAT comprises scheduling the at least some of the second plurality of wireless communication devices on the second RAT based on the first information, the second information, the first precoder information, and the second precoder information in such a manner that multi-RAT MU-MIMO parings across the first and second RATs are considered.

In some embodiments, the wireless communication system is a cellular communications network, the first plurality of wireless communication devices is a first plurality of User Equipment devices (UEs), and the second plurality of wireless communication devices is a second plurality of UEs.

In some embodiments, the at least one radio unit used by the first RAT and the at least one radio unit used by the second RAT are the same at least one radio unit.

In some embodiments, the at least one radio unit used by the first RAT and the at least one radio unit used by the second RAT are separate radio units that are physically collocated.

In some embodiments, the at least one radio unit used by the first RAT and the at least one radio unit used by the second RAT are separate radio units that are not physically collocated.

Embodiments of a scheduler are also disclosed. In some embodiments, a scheduler for scheduling wireless communication devices in a wireless communication system that provides radio access via a first RAT and a second RAT is adapted to obtain first information comprising channel information regarding channels between a first plurality of wireless communication devices and at least one radio unit used by the first RAT, or scheduling information for the first RAT. The scheduling information for the first RAT comprises: (a) information that indicates one or more sets of time-frequency resources on which the first plurality of wireless communication devices are scheduled on the first RAT and (b) for each of the one or more sets of time-frequency resources, channel information regarding the channel between a respective wireless communication device scheduled on the set of time-frequency resources on the first RAT and at least one radio unit used by the first RAT. The scheduler is further adapted to obtain second information comprising channel information regarding channels between a second plurality of wireless communication devices and at least one radio unit used by a second RAT, and schedule at least some of the second plurality of wireless communication devices on the second RAT based on the first information and the second information in such a manner that multi-RAT MU-MIMO parings across the first and second RATs are considered.

Embodiments of a network node implementing a scheduler are also disclosed. In some embodiments, a network node that implements a scheduler for scheduling wireless communication devices in a wireless communication system that provides radio access via a first RAT and a second RAT comprises a network interface, one or more processors, and memory comprising instructions executable by the one or more processors whereby the network node is operable to: obtain first information comprising channel information regarding channels between a first plurality of wireless communication devices and at least one radio unit used by the first RAT, or scheduling information for the first RAT. The scheduling information for the first RAT comprises: (a) information that indicates one or more sets of time-frequency resources on which the first plurality of wireless communication devices are scheduled on the first RAT and (b) for each of the one or more sets of time-frequency resources, channel information regarding the channel between a respective wireless communication device scheduled on the set of time-frequency resources on the first RAT and at least one radio unit used by the first RAT. Via execution of the instructions, the network node is further operable to obtain second information comprising channel information regarding channels between a second plurality of wireless communication devices and at least one radio unit used by a second RAT, and schedule at least some of the second plurality of wireless communication devices on the second RAT based on the first information and the second information in such a manner that multi-RAT MU-MIMO parings across the first and second RATs are considered.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
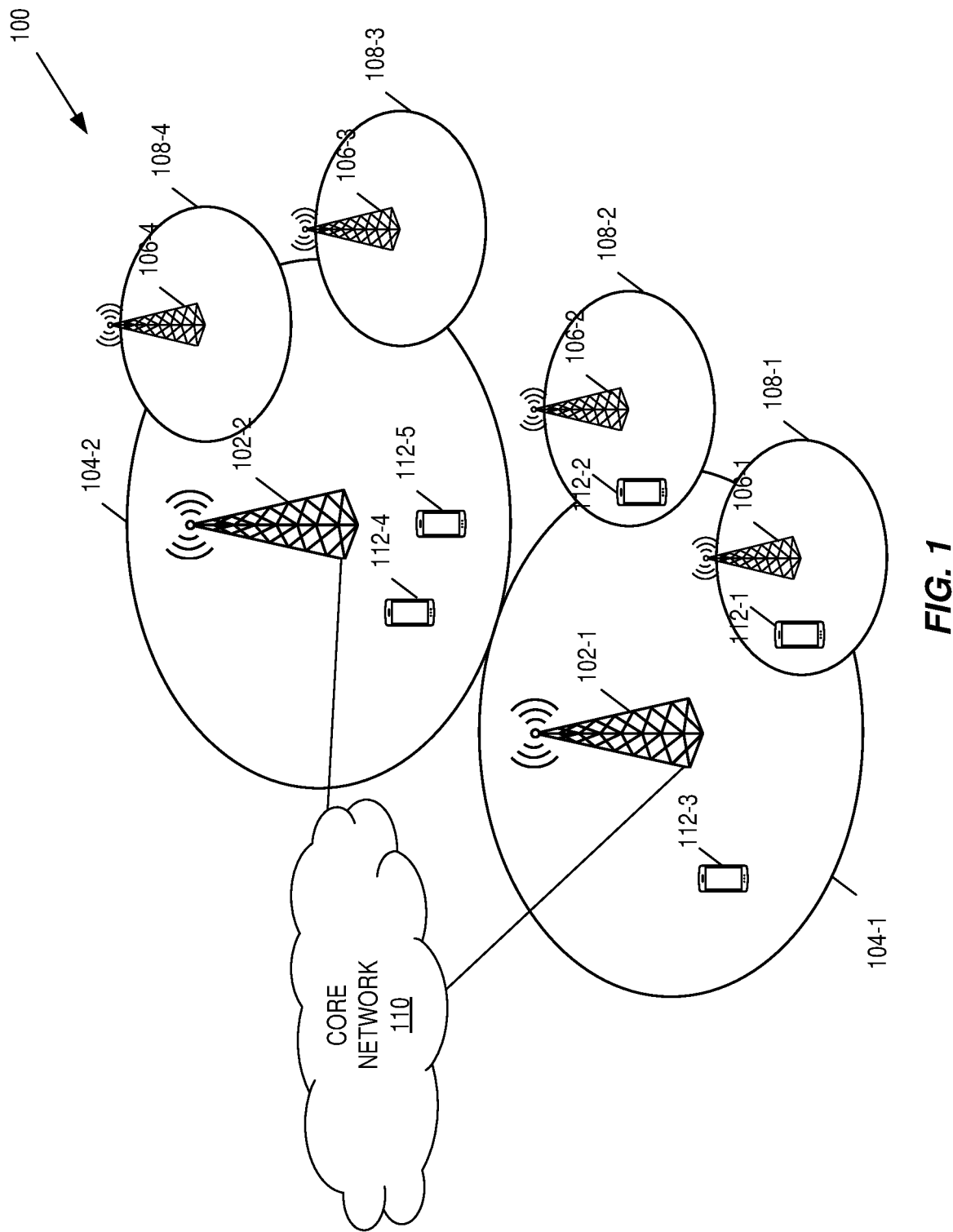
FIG. 1 illustrates one example of a cellular communications network in which a carrier/spectrum sharing scheme that utilizes spatial multiplexing between multiple Radio Access Technologies (RATs) is utilized according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" or "wireless communication device" is any type of device that has access to (i.e., is served by) a wireless communications networks (e.g., a cellular communications network) by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

As discussed above, some existing cellular communications systems utilize spectrum sharing schemes to allow at least two Radio Access Technologies (RATs) to be multiplexed in time and/or frequency over a single carrier or frequency band. As an example, there are existing cellular communications systems in which LTE and Global System for Mobile communications (GSM) resources can be multiplexed in frequency over a given carrier. Such multiplexing allows the gradual migration of spectrum from one RAT to another or allows a legacy RAT to still be supported without having to dedicate the full carrier bandwidth to that RAT.

However, existing carrier sharing schemes are less than optimal for a 5G RAT. Specifically, radio access nodes (e.g., a gNB) in a 5G RAT include an Advanced Antenna System (AAS) having many antennas, which are utilized to provide Massive Multiple Input Multiple Output (Massive MIMO) operation. With the existing carrier sharing schemes, the potential spatial multiplexing aspect enabled by the use of the AAS is not exploited between the RATs, limiting the spatial multiplexing gains which can be obtained, especially when there are few user devices belonging to one of the RATs. In particular, a RAT with few UEs has few Multiple-User MIMO (MU-MIMO) opportunities on its own. However, if spatial multiplexing between RATs is allowed, the total number of UEs across the at least two RATs can be used for spatial user multiplexing. In this manner, higher spectral efficiency can be achieved.

With the advent of AAS and Massive MIMO, there is now a possibility to do carrier sharing in the spatial domain, i.e. by assigning the same time-frequency resources to two or more RATs, which will be separable in the spatial domain. In particular, multi-layer transmissions are utilized as in a typical MIMO system with multi-layer transmissions, except that different layers can now be associated with different RATs. So, while the existing carrier sharing scheme multiplexes RATs on a given carrier in the time and/or frequency domain, systems and methods are disclosed herein that provide a carrier sharing scheme that allows for the multiplexing of the RATs on a given carrier in the spatial domain and, optionally, also in the time domain and/or the frequency domain. This allows for greater flexibility and a higher potential level of spectral efficiency, especially if the number of UEs in one of the RATs is small.

While not being limited to or by any particular advantage, embodiments of the present disclosure provide a number of advantages as compared to the existing carrier sharing scheme. More specifically, over time, the amount of spectrum allocated to cellular communications continues to grow. As such, one could think that carrier sharing has become less important. However, this would be a wrong assessment. The reality is that coverage is more difficult at higher bands. Since new RATs (e.g., 5G NR) are being deployed or will be deployed at higher frequencies, there will be more and more RATs that would like to be able to rely on lower bands for coverage. There is therefore additional pressure for being able to share the precious lower frequency bands.

When using the carrier/spectrum sharing scheme disclosed herein, the spatial user multiplexing opportunities are linked to the total number of UEs across all of the RATs, not to the number of UEs in any single RAT. This allows for more user spatial multiplexing and hence higher spectral efficiency. As low frequencies which have better coverage are more and more in demand, being able to increase the level of multiplexing is beneficial.

Another advantage is related to energy performance. Since multiple RATs are able to share a given frequency band more effectively using the spatial domain in addition to the time and frequency domain, this means that other bands are likely to be less occupied, which would allow for more opportunities to improve energy performance using hardware power reduction features.

FIG. 1 illustrates one example of a cellular communications network 100 in which a carrier/spectrum sharing scheme that utilizes spatial multiplexing between multiple RATs is utilized according to some embodiments of the present disclosure. Note that the spatial multiplexing between multiple RATs is also referred to herein as multi-RAT MU-MIMO in the case of two or more UEs and multi-RAT Single-User MIMO (SU-MIMO) in the case of a single UE. Also note that while embodiments of the present disclosure are described with respect to a cellular communications network (e.g., the cellular communications network 100), the embodiments described herein are more generally applicable to any type of wireless communication system in which two or more RATs can use the same time-frequency resources and in which transmit nodes are capable of forming different transmit beams (i.e., transmit in different beam directions).

In this example, the cellular communications network 100 includes base stations 102-1 and 102-2, which in LTE are referred to as eNBs and in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications network 100 may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The base stations 102 (and optionally the low power nodes 106) are connected to a core network 110.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

As discussed herein, in some embodiments, at least some of the base stations 102 are multi-RAT base stations 102 that utilize the same carrier or frequency spectrum for at least two RATs (e.g., 5G NR and LTE) in accordance with a carrier/spectrum sharing scheme. According to embodiments of the present disclosure, the carrier/spectrum sharing scheme uses spatial domain multiplexing (e.g., multi-RAT MU-MIMO) and, optionally, time-domain and/or frequency-domain multiplexing between the RATs. Note that carrier/spectrum sharing using spatial domain multiplexing is also referred to herein as Spatial Division Multiple Access (SDMA) carrier sharing.

In regard to multi-RAT MU-MIMO, the main mechanism is similar to the conventional MU-MIMO user pairing and layer assignment procedure, except that inter-RAT pairing is also considered/allowed. In some embodiments, scheduling (i.e., radio resource management) is jointly performed for all of the RATs so that appropriate channel information for UEs of all RATs is considered jointly to assess channel orthogonality required for selecting appropriate (multi-RAT) UE pairings. Note that, a "UE pairing" may include any number of two or more UEs. In some other embodiments, scheduling or radio resource management is coordinated between the RATs such that appropriate multi-RAT UE pairings can be selected. The level of orthogonality between the UEs in a multi-RAT UE pairing needs to be sufficient to establish that adding an extra spatial multiplexing layer on a given RAT will result in throughput/latency improvements despite the presence of additional inter-layer (and inter-RAT) interference.

Figure 2:
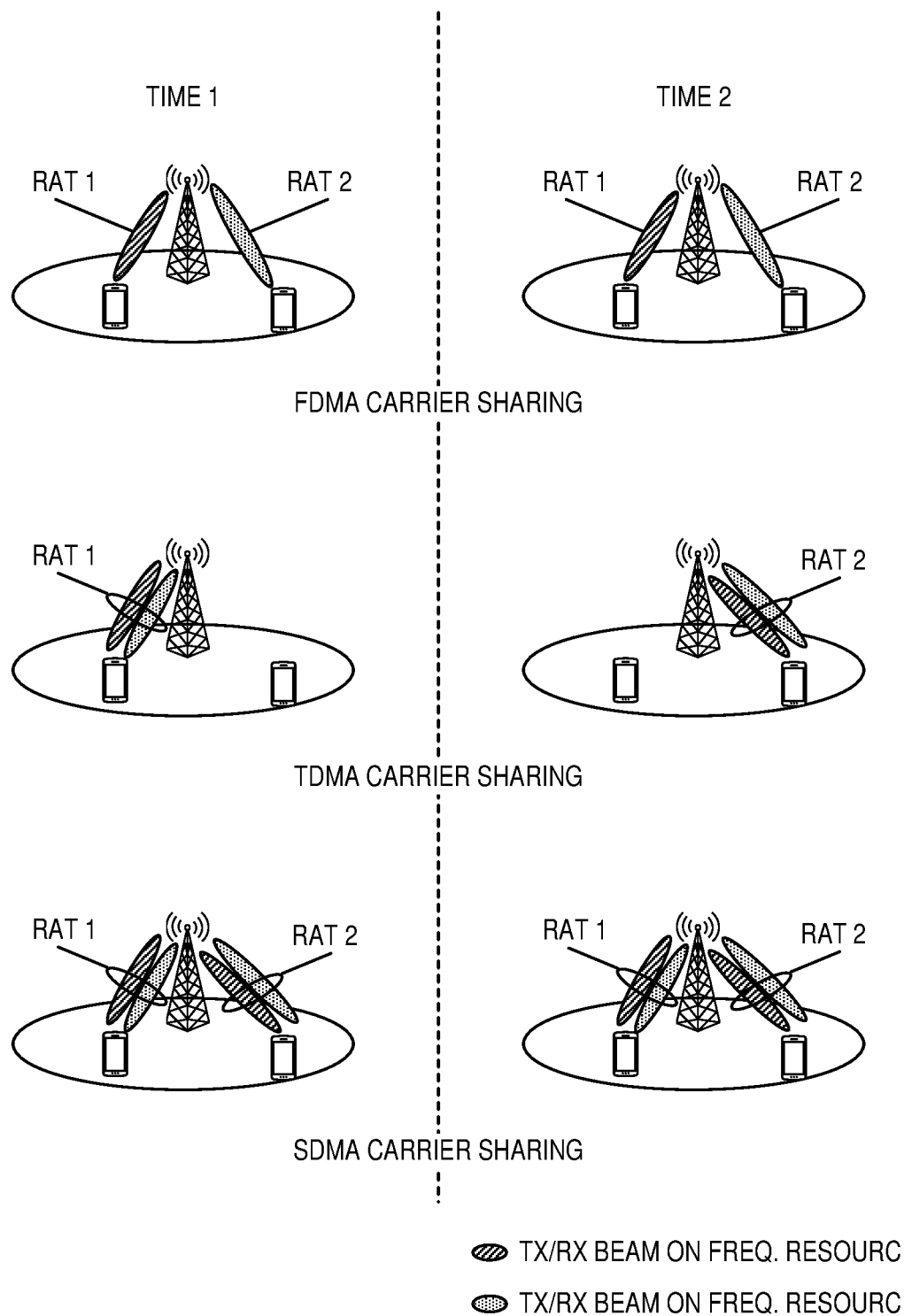
FIG. 2 illustrates an example of Frequency Domain Multiple Access (FDMA) carrier sharing, Time Domain Multiple Access (TDMA) carrier sharing, and Spatial Domain Multiple Access (SDMA) carrier sharing in accordance with some embodiments of the present disclosure.

FIG. 2 illustrates Frequency Domain Multiple Access (FDMA) carrier sharing, Time Domain Multiple Access (TDMA) carrier sharing, and SDMA carrier sharing in accordance with some embodiments of the present disclosure. As illustrated, when using FDMA carrier sharing, a first transmit (TX)/receive (RX) beam on a first set of frequency resources is utilized for a first UE in a first RAT (RAT1), both at time 1 and time 2. Likewise, when using FDMA carrier sharing, a second TX/RX beam on a second set of frequency resources is utilized for a second UE in a second RAT (RAT2), both at time 1 and time 2. When using TDMA carrier sharing, a first TX/RX beam on a first set of frequency resources and a second TX/RX beam on a second set of frequency resources are both utilized for a first UE in a first RAT (RAT1) at time 1. Likewise, at time 2, a first TX/RX beam on the first set of frequency resources and a second TX/RX beam on the second set of frequency resources are both utilized for a second UE in a second RAT (RAT2). In contrast, when using SDMA carrier sharing, a first TX/RX beam on a first set of frequency resources and a second TX/RX beam on a second set of frequency resources are both utilized for a first UE in a first RAT (RAT1) at both time 1 and time 2. In addition, a first TX/RX beam on the first set of frequency resources and a second TX/RX beam on the second set of frequency resources are both utilized for a second UE in the second RAT (RAT2) at both time 1 and time 2. In other words, when using SDMA carrier sharing, the same set of time and frequency resources is utilized by both RAT1 and RAT2 by using spatial division multiplexing.

Figure 3:
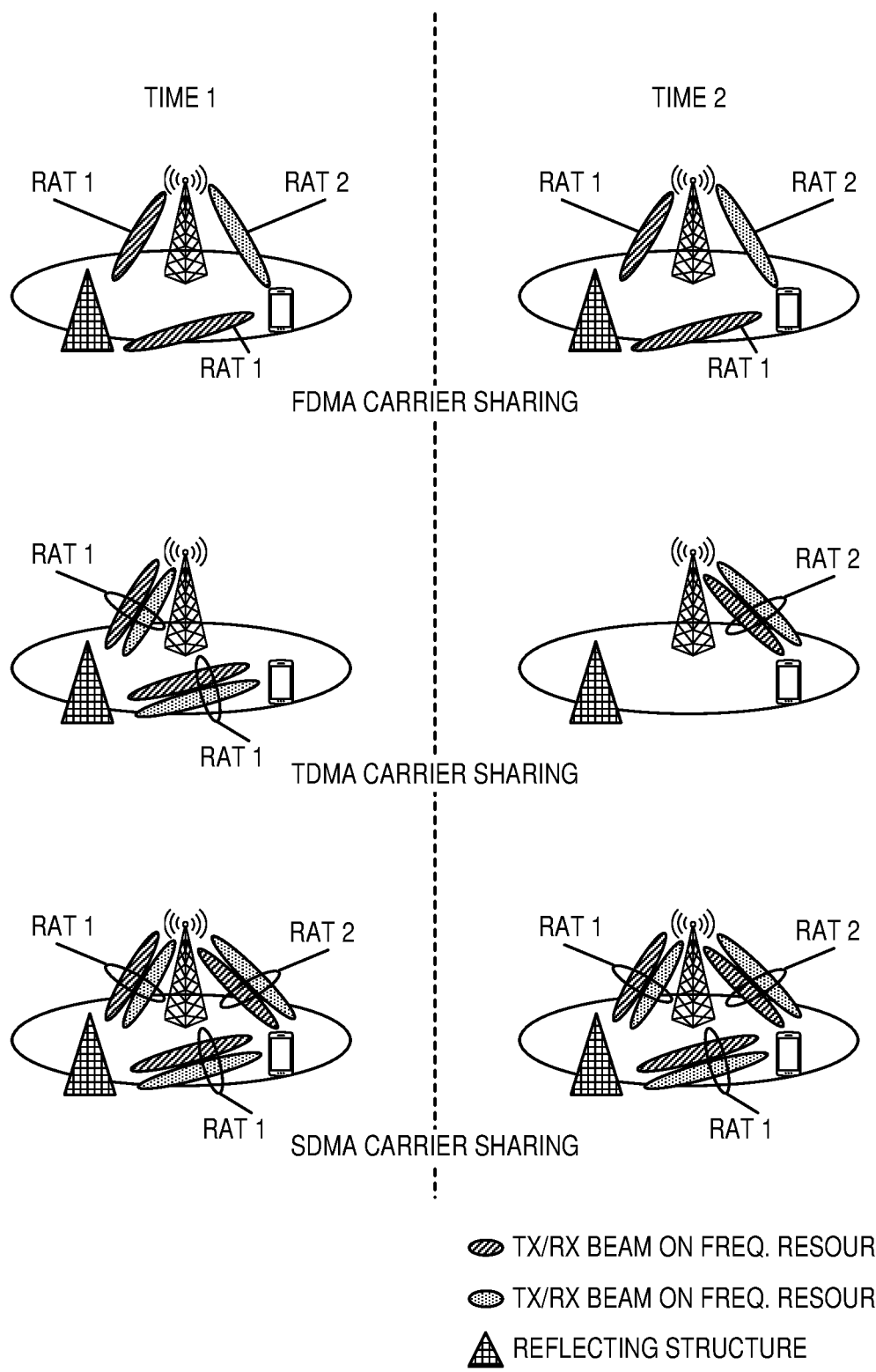
FIG. 3 illustrates another example of FDMA carrier sharing, TDMA carrier sharing, and SDMA carrier sharing in accordance with some embodiments of the present disclosure.

Note that while multi-RAT MU-MIMO is oftentimes described herein, the disclosed carrier/spectrum sharing scheme can also utilize multi-RAT SU-MIMO. In other words, multi-layer multi-RAT transmissions/receptions to/from a single UE can also be used. One example of carrier/spectrum sharing using multi-RAT SU-MIMO is illustrated in FIG. 3. In the case of multi-RAT SU-MIMO, channel orthogonality between two paths to/from the base station 102 from/to the UE allows for two (or more) spatial-domain layers on two (or more) RATs to be used. The benefit of this SU-MIMO approach is not to increase pairing opportunities as the UE is able to use both RATs and could use the multi-layered transmission/reception within a single RAT. The benefit would be the added flexibility to reuse the same time-frequency resources for both RATs in systems for which configuration constraints could force certain types of control or data information to use one RAT or another. In the extreme case for which there is a single UE but the system needs to use both RATs, the full time-frequency resource sets could be used by both RATs given that the channel conditions allow it.

The carrier/spectrum sharing scheme disclosed herein utilizes multi-RAT MU-MIMO and/or multi-RAT SU-MIMO to enable carrier/spectrum sharing between two or more RATs by using spatial division multiplexing between the RATs on the same time-frequency resources. In some embodiments, Radio Resource Management (RRM) (e.g., scheduling) is jointly performed for the RATs or coordinated among the RATs to ensure that:

Simultaneous downlink transmissions on different RATs, on the same time-frequency resources, are only allowed when the downlink channels on the different RATs are sufficiently orthogonal to allow for an overall increase in the system performance (throughput and/or latency and/or reliability) through good enough reception at the user terminals of the signals on the different RATs. In regard to being sufficiently orthogonal, simulations or historical observations can be used to learn that when the correlation coefficient between estimated channel vectors (antenna elements) is below a certain level, MU-MIMO increases performance (e.g., throughput, reliability, or the like) on average. In regard to good enough reception at the user terminals, this means good enough to statistically result in increased performance.

Simultaneous uplink transmissions on different RATs, on the same time-frequency resources, are only allowed when the uplink channels on the different RATs are sufficiently orthogonal to allow for an overall increase in the system performance (throughput and/or latency and/or reliability) through good enough reception at the radio access node (or quasi-collocated access nodes) of the signals on the different RATs. Quasi-collocated nodes might imply that some level of AAS calibration across nodes might be required. Also note that the node could be split into an antenna near and an antenna far part. In that case, any possible variant, e.g. a single antenna near part with two antenna far parts; a single antenna near part with two antenna far parts; two of each; etc. may be used.

This coordination relies on:

obtaining channel information (e.g., channel state information), e.g., through sounding with feedback or based on reciprocity, for possible transmissions on the different RATs;

a centralized or distributed sharing of the channel information associated with the considered possible transmissions on the different RATs;

an evaluation of the orthogonality based on the channel information for the considered possible transmissions on the different RATs, e.g., considering both the channels and transmit and receive precoders; and the selection of appropriate source-destination pairs for the multiple RATs, meeting channel orthogonality criteria appropriate to allow for an overall increase in the system performance (throughput and/or latency and/or reliability).

Figure 4:
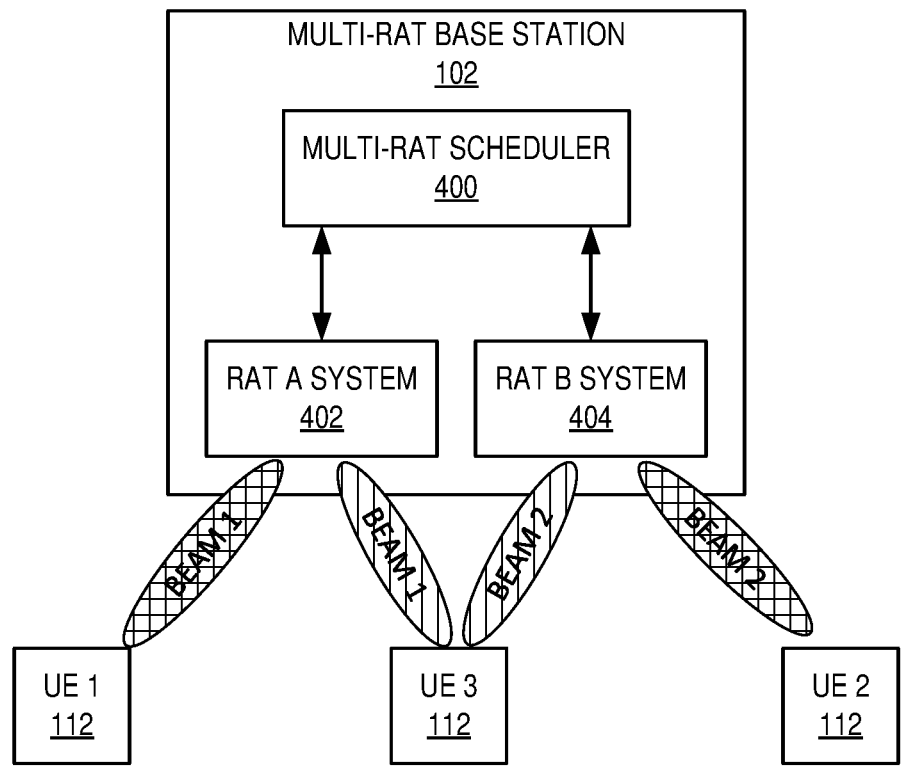
FIG. 4 illustrates one example of a multi-RAT base station including a multi-RAT scheduler that performs joint scheduling for multiple RATs in accordance with a carrier/spectrum sharing scheme that utilizes spatial multiplexing between multiple RATs in accordance with some embodiments of the present disclosure.
Figure 4:
Figure 4:

In some embodiments, multi-RAT joint scheduling is utilized to provide carrier/spectrum sharing using multi-RAT MU-MIMO and/or multi-RAT SU-MIMO. One example is illustrated in FIG. 4. In this embodiment, a multi-RAT base station 102 includes a multi-RAT scheduler 400, a first RAT system 402 (referred to as a RAT A system 402), and a second RAT system 404 (referred to as a RAT B system 404). The RAT A system 402 includes hardware or a combination of hardware and software utilized to provide the functionality of the multi-RAT base station 102 for RAT A. The RAT B system 404 includes hardware or a combination of hardware and software utilized to provide the functionality of the multi-RAT base station 102 for RAT B. In particular, among other things, the RAT A system 402 and the RAT B system 404 include one or more radio units. A radio unit includes one or more transmitters, one or more receivers, and a number of antennas. In some embodiments, the RAT A system 402 and the RAT B system 404 share one or more radio units (i.e., use the same radio unit(s)). In some other embodiments, the RAT A system 402 and the RAT B system 404 have separate radio units where these separate radio units are collocated. Note that while only two RATs are used in this example, any number of two or more RATs may be used.

The multi-RAT scheduler 400 is implemented in hardware or a combination of hardware and software (e.g., software stored in memory and executed by one or more processors). In general, the multi-RAT scheduler 400 obtains information from the RAT A system 402 and the RAT B system 404. Based on this information, the multi-RAT scheduler 400 performs joint scheduling for RAT A and RAT B in accordance with a carrier/spectrum sharing scheme that utilizes spatial multiplexing between different RATs (e.g., multi-RAT MU-MIMO, e.g., using a multi-RAT MU-MIMO pairing including UE 1 and UE 2 and/or multi-RAT SU-MIMO, e.g., using UE 3). In other words, the carrier/spectrum sharing scheme utilizes SDMA carrier/spectrum sharing and, optionally, TDMA carrier/spectrum sharing and/or FDMA carrier/spectrum sharing.

Note that while the multi-RAT scheduler 400, the RAT A system 402, and the RAT B system 404 are illustrated in the example of FIG. 4 as being part of the same multi-RAT base station 102, the present disclosure is not limited thereto. For example, the multi-RAT scheduler 400 may alternatively be implemented on a separate node, e.g., a separate node that performs multi-RAT scheduling for multiple base stations 102. Still further, the RAT A system 402 and the RAT B system 404 may alternatively be implemented in separate base stations 112.

Figure 5:
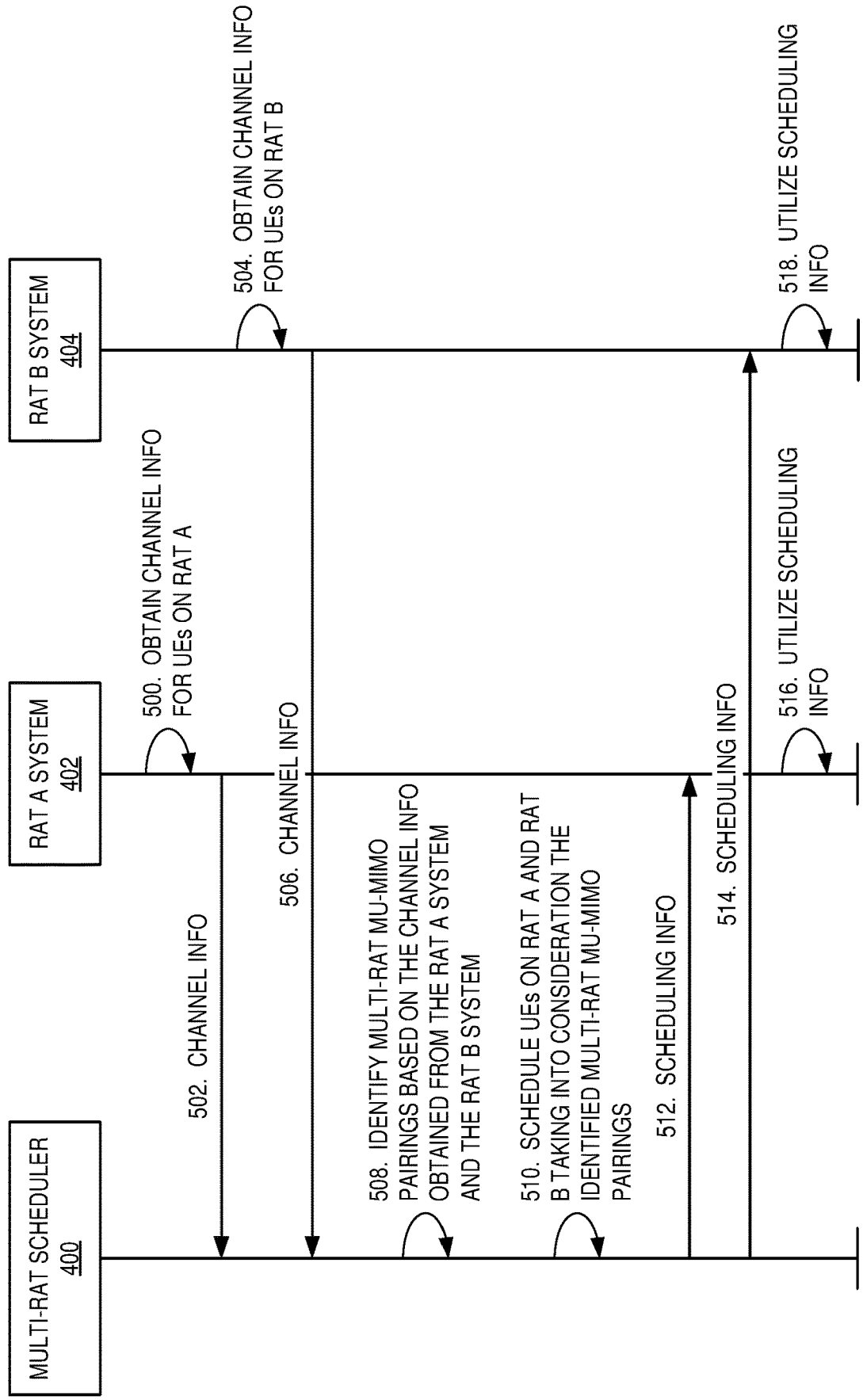
FIG. 5 illustrates the operation of the multi-RAT base station of FIG. 4 in accordance with some embodiments of the present disclosure.

FIG. 5 illustrates the operation of the multi-RAT base station 102 of FIG. 4 in more detail according to some embodiments of the present disclosure. As illustrated, the RAT A system 402 obtains channel information (e.g., channel state information) for UEs 112, including UE 1 and UE 3, served by RAT A (step 500) and provides the channel information for the UEs 112 served by RAT A to the multi-RAT scheduler 400 (step 502). For each of the UEs 112 served by RAT A, the channel information for that UE 112 is channel information regarding the channel between the UE 112 and the radio unit(s) used for RAT A (i.e., the radio unit(s) of the RAT A system 402). Likewise, the RAT B system 404 obtains channel information (e.g., channel state information) for UEs 112, including UE 2 and UE 3, served by RAT B (step 504) and provides the channel information for the UEs 112 served by RAT B to the multi-RAT scheduler 400 (step 506). For each of the UEs 112 served by RAT B, the channel information for that UE 112 is channel information regarding the channel between the UE 112 and the radio unit(s) used for RAT B (i.e., the radio unit(s) of the RAT B system 404). In addition, the RAT A system 402 may provide, e.g., in step 502, information regarding transmit and/or receive precoders utilized for transmission and/or reception of signals to/from the UEs 112 served by RAT A. Likewise, the RAT B system 404 may provide, e.g., in step 506, information regarding transmit and/or receive precoders utilized for transmission and/or reception of signals to/from the UEs 112 served by RAT B.

The channel information may be obtained by the RAT A system 402 and the RAT B system 404 using any suitable technique (e.g., any conventional process used to obtain channel information such as channel state information). Further, the type of channel information obtained and provided to the multi-RAT scheduler 400 may vary depending on the particular manner in which the multi-RAT scheduler 400 identifies, or selects, multi-RAT MU-MIMO pairings and/or identifies, or selects, a single UE (e.g., UE 3) for multi-RAT SU-MIMO. Also, while some example techniques for identifying multi-RAT MU-MIMO pairings are described herein, any technique for identifying, or selecting, a MU-MIMO pairing for a single RAT can easily be extended to multiple RATs by obtaining channel information for the different RATs.

As an example, for a line-of-sight scenario, the channel information for the channel between the radio unit(s) of the RAT A/B system 402/404 and a particular UE 112 includes information that indicates an angular distribution of power of the channel between the radio unit(s) of the RAT A/B system 402/404 and the particular UE 112. For a Time Division Duplexing (TDD) system, the angular distribution of power can be computed using reciprocity to compute the downlink angular power distribution from the uplink measured angular distribution. If the system is Frequency Division Duplexing (FDD), angular distribution measured in the uplink can still be representative of what is expected in the downlink, especially if the frequencies are not too distant between uplink and the downlink. In all cases, it is also possible to sweep directional beams in the downlink and ask the UE 112 to report on the beam strengths. It is also possible to use reference signals associated with transmit antenna ports in the downlink and have the UE 112 report on the associated channel estimates, which can then be converted from the antenna ports domain to a direction domain using an appropriate transformation (matrix multiplications). Using this type of channel information, two UEs (e.g., UE 1 and UE 2) may be identified as a multi-RAT MIMO pairing if channel information for the channel between UE 1 and the radio unit(s) of the RAT A system 402 indicates that the power associated with this channel of UE 1 contains a particular angular range for which there is little power and the channel information for the channel between UE 2 and the radio unit(s) of the RAT B system 404 indicates that the power associated with the channel of UE 2 is high for the same angular range.

As another example, including non-line-of-sight, for downlink (but similarly for uplink), the channel information for the channel between the radio unit(s) of the RAT A/B system 402/404 and a particular UE 112 includes a channel estimate vector for the channel. Using this type of channel information, two UEs (e.g., UE 1 and UE 2) may be identified as a multi-RAT MIMO pairing as follows. The multi-RAT scheduler 400 multiplies the transmit precoder utilized for the downlink from the RAT A system 402 to UE 1 with the channel estimate vector (vector because of multi-antennas) for UE 2 on RAT B and take the norm. The result will give information about the magnitude of the interference at UE 2 caused by a simultaneous transmission for UE 1. If the interference at UE 2 caused by a simultaneous transmission for UE 1 is less than a predefined or preconfigured threshold, then UE 1 on RAT A and UE 2 on RAT B are selected as a multi-RAT MU-MIMO pairing.

Similarly, in some embodiments, the multi-RAT scheduler 400 multiplies the transmit precoder utilized for the downlink from the RAT B system 404 to UE 2 with the channel estimate vector (vector because of multi-antennas) for UE 2 on RAT B and takes the norm. The result gives information about the magnitude of the desired signal received at UE 2. The same can be done for UE 1 on RAT A. Using this information, the multi-RAT scheduler 400 can determine whether the interference, given proper link adaptation, still results in better performance with simultaneous transmission to UE 1 and UE 2 on RAT A and RAT B, respectively, compared with transmitting only to UE 1 on RAT A or only to UE 2 on RAT B. If so, UE 1 and UE 2 are selected as a multi-RAT MU-MIMO pairing.

Note that the examples given above are only examples. Any suitable channel information needed by or beneficial to the multi-RAT scheduler 400 may be provided in steps 502 and 506.

Using the channel information and, optionally, additional information (e.g., information regarding transmit or receiver precoders), the multi-RAT scheduler 400, e.g., tries to maximize a specific utility function in doing radio resource allocation. The utility function may be, for example, cell throughput, reliability, latency, or the like, or any weighted combination thereof. However, the multi-RAT scheduler 400 is not restricted to selecting MU-MIMO pairings within a single RAT. The multi-RAT scheduler 400 has the additional flexibility to consider multi-RAT MU-MIMO pairings across RATs.

More specifically, the multi-RAT scheduler 400 schedules UEs 112 on RAT A and RAT B based on the channel information obtained in steps 502 and 506 and, optionally, additional information (e.g., information regarding transmit and/or receiver precoders) in such a manner that multi-RAT MU-MIMO pairings and/or multi-RAT SU-MIMO UEs are considered. In this illustrated example, the multi-RAT scheduler 400 identifies one or more multi-RAT MU-MIMO pairings (and/or a UE 112 for multi-RAT SU-MIMO) based on the channel information obtained in steps 502 and 506 and, optionally, additional information (e.g., information regarding transmit and/or receiver precoders) (step 508). The multi-RAT scheduler 400 schedules UEs 112 (e.g., UE 1, UE 2, UE 3) on RAT A and RAT B, taking into consideration the identified multi-RAT MU-MIMO pairings (and/or any identified UE 112 for multi-RAT SU-MIMO) (step 510).

Note that when identifying the multi-RAT MU-MIMO pairings and scheduling the UEs 112 on RAT A, the full set of time-frequency resources (i.e., the full carrier bandwidth over a given period of time, e.g., a subframe) is considered, but not as a whole. The full set of time-frequency resources are broken down in some blocks (i.e., into multiple sets of time-frequency resources), and the pairing opportunities are considered for each set of time-frequency resources. So, as an example with UE 1 and UE 2, UE 1 and UE 2 can be identified as a multi-RAT MU-MIMO pairing for time-frequency resource set A. However, UE 1 may additionally be scheduled on RAT A on an additional set(s) of time-frequency resources on which UE 2 is not scheduled in RAT B and/or UE 2 may additionally be scheduled on RAT B on an additional set(s) of time-frequency resources on which UE 1 is not scheduled in RAT A. This could happen because of the time and frequency selectivity of the channel, but also because the traffic buffer of a UE could be emptied before all pairing opportunities for that UE are exploited, because of power constraints, etc. Also note that the beam or directivity pattern used for a UE can vary from one time-frequency resource to the next because of the time-frequency selectivity, but also because of the pairing selection for the time-frequency resource.

In this example, the multi-RAT scheduler 400 provides scheduling information to the RAT A system 402 (step 512) and to the RAT B system 404 (step 514). This scheduling information can take any form. The scheduling information provided to the RAT A system 402 includes, for each identified multi-RAT MU-MIMO pairing, information that indicates the UE 112 (e.g., UE 1) on RAT A that is included in the multi-RAT MU-MIMO pairing and information that indicates a set of time-frequency resources scheduled for the UE 112 (e.g., UE 1) on RAT A that is included in the multi-RAT MU-MIMO pairing. In some embodiments, the scheduling information provided to the RAT A system 402 also includes scheduling information for all UEs 112 scheduled on RAT A (i.e., the multi-RAT scheduler 400 can perform scheduling for all UEs 112 in RAT A, not just those UEs 112 that are identified as part of a multi-RAT MU-MIMO pairing or identified for multi-RAT SU-MIMO). Likewise, the scheduling information provided to the RAT B system 404 includes, for each identified multi-RAT MU-MIMO pairing, information that indicates the UE 112 (e.g., UE 2) on RAT B that is included in the multi-RAT MU-MIMO pairing and information that indicates a set of time-frequency resources scheduled for the UE 112 (e.g., UE B) on RAT B that is included in the multi-RAT MU-MIMO pairing. In some embodiments, the scheduling information provided to the RAT B system 404 also includes scheduling information for all UEs 112 scheduled on RAT B (i.e., the multi-RAT scheduler 400 can perform scheduling for all UEs 112 in RAT B, not just those UEs 112 that are identified as part of a multi-RAT MU-MIMO pairing or identified for multi-RAT SU-MIMO).

As will be appreciated by one of skill in the art, additional information and/or signaling between the multi-RAT scheduler 400 and the RAT A system 402 and the RAT B system 404 may be used in practice. For instance, in practice, the multi-RAT scheduler 400 may also handle link adaptation.

Thus, the scheduling information may include resources to use, transmit precoders, transmit power levels, and other link adaptation parameters such as modulation and coding parameters. Note that the multi-RAT scheduler 400 would also use other parameters not necessarily coming from the RAT A system 402 and the RAT B system 404 such as, e.g., transmit buffer information and traffic type information for the buffers (e.g., delay tolerant traffic or delay-critical traffic, etc.). Also, while not illustrated, for the downlink, the RAT A system 402 and the RAT B system 404 would also obtain the actual data to encode and transmit. However, the intent of FIG. 5 is to show the details that are relevant to this embodiment of the present disclosure. As such, other steps that may be used in practice and which are commonly known to those of skill in the art are not illustrated.

The RAT A system 402 utilizes the scheduling information received from the multi-RAT scheduler 400 (step 516). For example, for each multi-RAT MU-MIMO pairing identified by the multi-RAT scheduler 400, the RAT A system 402 transmits a downlink signal to or receives an uplink signal from the UE 112 on RAT A that is in the multi-RAT MU-MIMO pairing in accordance with the corresponding scheduling information received from the multi-RAT scheduler 400. Likewise, the RAT B system 404 utilizes the scheduling information received from the multi-RAT scheduler 400 (step 518). For example, for each multi-RAT MU-MIMO pairing identified by the multi-RAT scheduler 400, the RAT B system 404 transmits a downlink signal to or receives an uplink signal from the UE 112 on RAT B that is in the multi-RAT MU-MIMO pairing in accordance with the corresponding scheduling information received from the multi-RAT scheduler 400.

In FIGS. 4 and 5, the multi-RAT scheduler 400 is used to perform joint scheduling for RAT A and RAT B. In some other embodiments, scheduling is performed in a distributed manner using a sequential approach. In this sequential approach, separate schedulers for the different RATs perform scheduling sequentially on given time-frequency resources. The scheduler for the first RAT would schedule only considering its own RAT, while the scheduler for the second RAT would come next and try to see if adding appropriate spatial multiplexing layers from its own RAT, on the same time-frequency resources, can improve performance, and so on (if there are additional RATs). In some embodiments, a priority order is assigned to the RAT schedulers. Further, in some embodiments, the priority order can change, e.g., based on traffic prioritization across the RATs.

Figure 6:
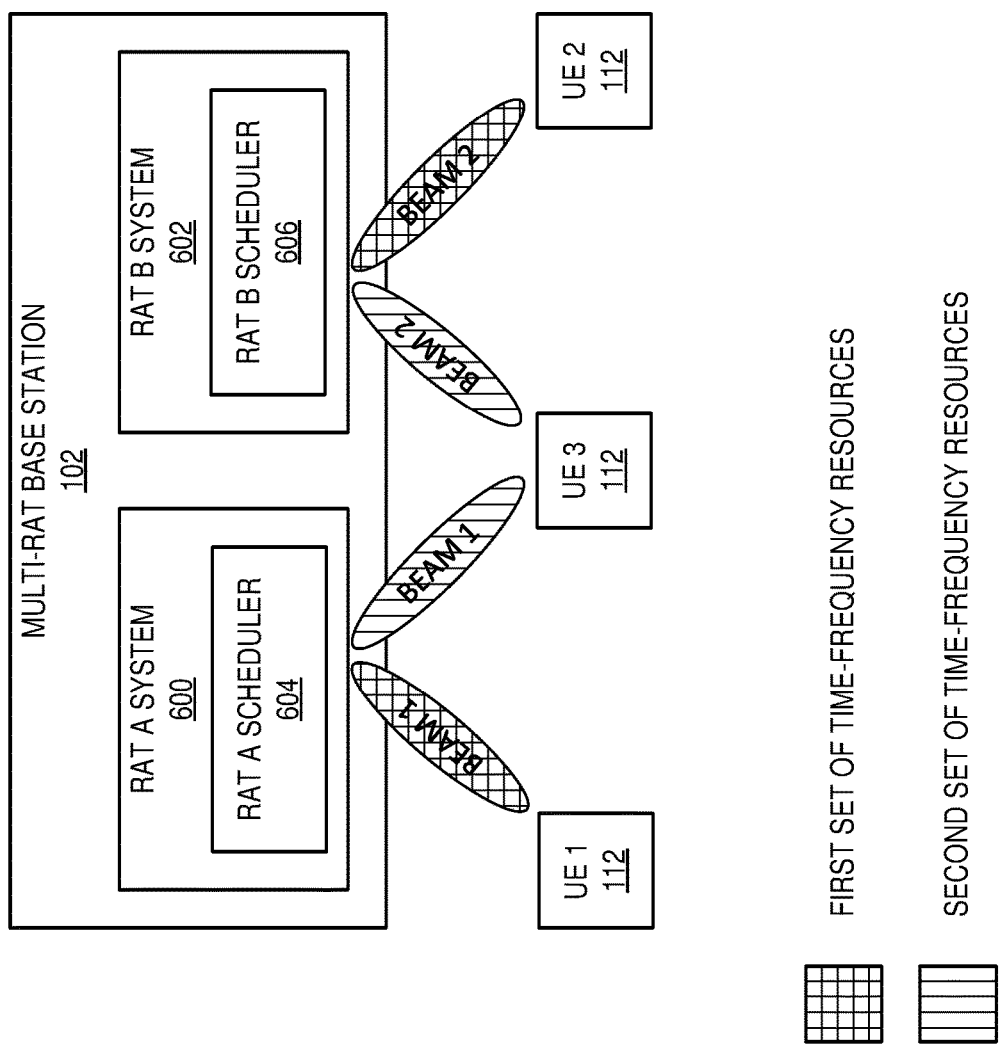
FIG. 6 illustrates one example of a multi-RAT base station including separate schedulers for multiple RATs that perform distributed scheduling for multiple RATs in accordance with a carrier/spectrum sharing scheme that utilizes spatial multiplexing between multiple RATs in accordance with some embodiments of the present disclosure.

In this regard, FIG. 6 illustrates one example of a multi-RAT base station 102 in which scheduling across multiple RATs is performed in accordance with a sequential approach in accordance with some other embodiments of the present disclosure. As illustrated, the multi-RAT base station 102 includes a first RAT system 600 (referred to as a RAT A system 600), and a second RAT system 602 (referred to as a RAT B system 602). The RAT A system 600 includes hardware or a combination of hardware and software utilized to provide the functionality of the multi-RAT base station 102 for RAT A. The RAT B system 602 includes hardware or a combination of hardware and software utilized to provide the functionality of the multi-RAT base station 102 for RAT B. In particular, among other things, the RAT A system 402 and the RAT B system 404 include one or more radio units. A radio unit includes one or more transmitters, one or more receivers, and a number of antennas. In some embodiments, the RAT A system 402 and the RAT B system 404 share one or more radio units (i.e., use the same radio unit(s)). In some other embodiments, the RAT A system 402 and the RAT B system 404 have separate radio units where these separate radio units are collocated. Note that while only two RATs are used in this example, any number of two or more RATs may be used.

The RAT A system 600 includes a RAT A scheduler 604, and the RAT B system 602 includes a RAT B scheduler 606. The RAT A scheduler 604 is implemented in hardware or a combination of hardware and software (e.g., software stored in memory and executed by one or more processors). Likewise, the RAT B scheduler 606 is implemented in hardware or a combination of hardware and software (e.g., software stored in memory and executed by one or more processors).

In general, the RAT A scheduler 604 schedules the UEs 112 (e.g., UE 1 and UE 2) on RAT A, e.g., using a conventional scheduling scheme. The RAT A scheduler 604 provides information to the RAT B scheduler 606, where this information includes information that indicates: (a) sets of time-frequency resources scheduled on RAT A and (b) for each set of time frequency resources, channel information for the channel between the radio unit(s) of the RAT A system 600 and the respective UE 112 on RAT A. This information may include additional information such as, e.g., information regarding transmit and/or receive precoders utilized for the UEs 112 scheduled on RAT A. Based on this information, the RAT B scheduler 606 performs scheduling for RAT B in accordance with a carrier/spectrum sharing scheme that utilizes spatial multiplexing between different RATs (e.g., multi-RAT MU-MIMO, e.g., using a multi-RAT MU-MIMO pairing including UE 1 and UE 2 and/or multi-RAT SU-MIMO, e.g., using UE 3). In other words, the carrier/spectrum sharing scheme utilizes SDMA carrier/spectrum sharing and, optionally, TDMA carrier/spectrum sharing and/or FDMA carrier/spectrum sharing.

Note that while the RAT A system 600 and the RAT B system 602 are illustrated in the example of FIG. 6 as being part of the same multi-RAT base station 102, the present disclosure is not limited thereto. For example, the RAT A system 600 and the RAT B system 602 may alternatively be implemented on separate nodes, e.g., in separate base stations 102.

Figure 7:
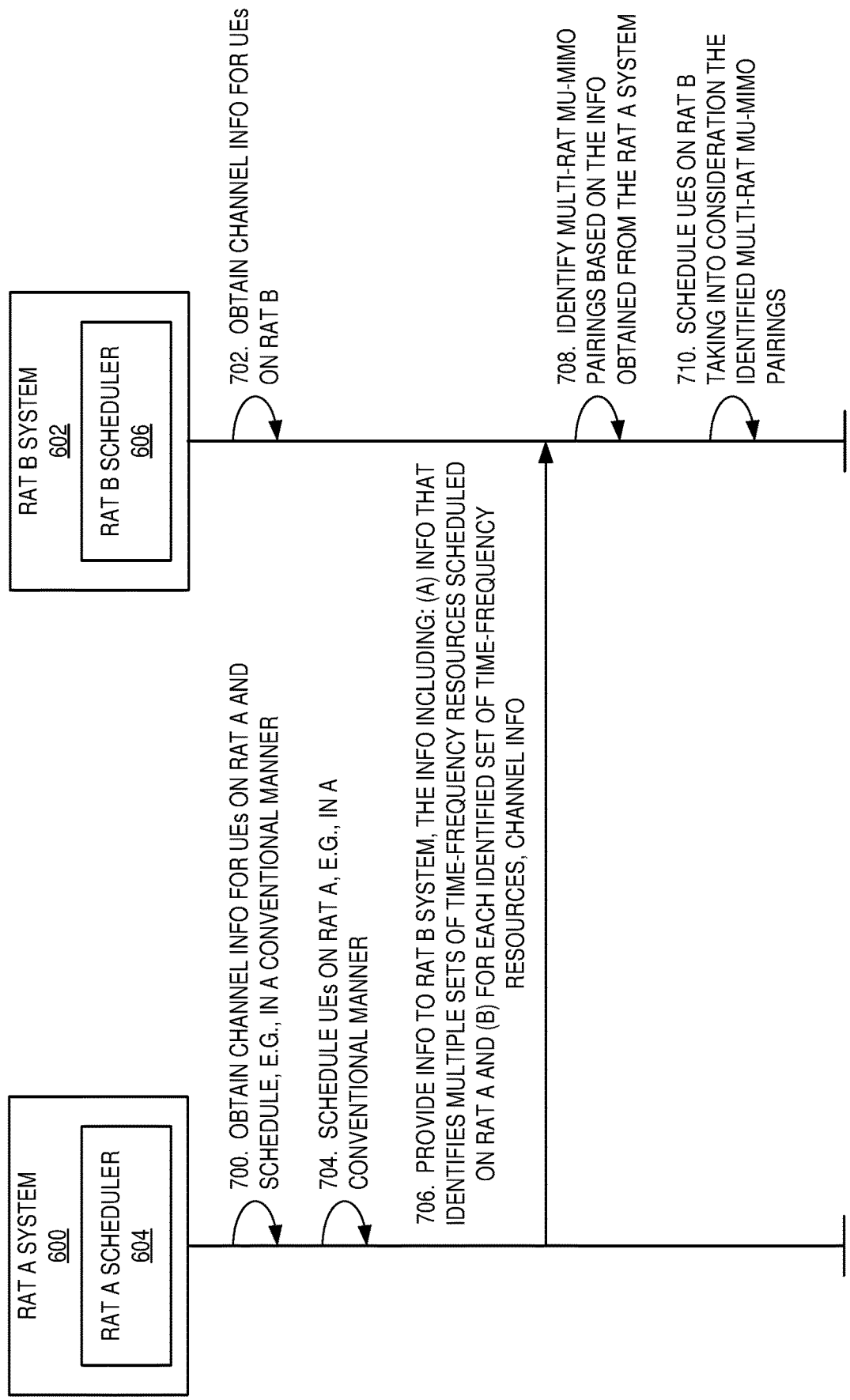
FIG. 7 illustrates the operation of the multi-RAT base station of FIG. 6 in accordance with some embodiments of the present disclosure.

FIG. 7 illustrates the operation of the multi-RAT base station 102 of FIG. 6 in more detail according to some embodiments of the present disclosure. As illustrated, the RAT A system 600 obtains channel information (e.g., channel state information) for UEs 112, including UE 1 and UE 3, served by RAT A (step 700). For each of the UEs 112 served by RAT A, the channel information for that UE 112 is channel information regarding the channel between the UE 112 and the radio unit(s) used for RAT A (i.e., the radio unit(s) of the RAT A system 600). Likewise, the RAT B system 602 obtains channel information (e.g., channel state information) for UEs 112, including UE 2 and UE 3, served by RAT B (step 702). For each of the UEs 112 served by RAT B, the channel information for that UE 112 is channel information regarding the channel between the UE 112 and the radio unit(s) used for RAT B (i.e., the radio unit(s) of the RAT B system 602). As discussed above, the channel information may be obtained in any suitable manner and may include different types of channel information depending on the particular embodiment. For example, as discussed above, for a line-of-sight scenario, the channel information for the channel between the RAT A/B system 600/602 and a particular UE 112 includes information that indicates an angular distribution of power of the channel between the radio unit(s) of the RAT A/B system 600/602 and the particular UE 112. As another example, including non-line-of-sight, for downlink (but similarly for uplink), the channel information for the channel between the radio unit(s) of the RAT A/B system 600/602 and a particular UE 112 includes a channel estimate vector for the channel.

In this example, the RAT A scheduler 604 schedules UEs 112 (e.g., UE 1 and UE 3) on RAT A, e.g., using a conventional scheduling scheme (step 704). The RAT A scheduler 604 provides information to the RAT B scheduler 606 (step 706). This information includes: (a) information that identifies multiple sets of time-frequency resources scheduled on RAT A and (b) for each identified set of time frequency resources, the channel information for the channel between the radio unit(s) of the RAT A system 600 and the respective UE 112 on RAT A.

Using this information together with the channel information for the UEs 112 on RAT B and, optionally, information regarding transmit and/or receive precoders, the RAT B scheduler 606 schedules UEs on RAT B based on the channel information in such a manner that multi-RAT MU-MIMO pairings and/or multi-RAT SU-MIMO UEs are considered. More specifically, in this example, the RAT B scheduler 606 identifies one or more multi-RAT MU-MIMO pairings (and/or a multi-RAT SU-MIMO UE) (step 708). More specifically, the RAT B scheduler 606, e.g., tries to maximize a specific utility function in doing radio resource allocation. However, the RAT B scheduler 606 is not restricted to selecting MU-MIMO pairings within RAT B. The RAT B scheduler 606 has the additional flexibility to consider multi-RAT MU-MIMO pairings across RATs. In the illustrated example of FIG. 6, the RAT B scheduler 606 identifies UE 2 on RAT B as being part of a multi-RAT MU-MIMO pairing with UE 1 on RAT A based on the information obtained in steps 702 and 706 and, optionally, additional information (e.g., information regarding transmit and/or receiver precoders). In addition, the RAT B scheduler 606 identifies UE 3 for multi-RAT SU-MIMO based on the information obtained in steps 702 and 706 and, optionally, additional information (e.g., information regarding transmit and/or receive precoders). The RAT B scheduler 606 schedules UEs 112 (e.g., UE 2, UE 3) on RAT B, taking into consideration the identified multi-RAT MU-MIMO pairings (and/or any identified UE 112 for multi-RAT SU-MIMO) (step 710). While not illustrated, the RAT A system 600 and the RAT B system 602 operate to transmit and/or receive to and/or from the scheduled UEs 112 in RATs A and B, respectively, as scheduled in steps 704 and 710.

It should be noted that the process of FIG. 7 is only an example. As one example variation, the scheduling process of FIG. 7 may be iterative. In particular, once scheduling is performed in step 710, the RAT B scheduler 606 may provide information back to the RAT A scheduler 604, where the RAT A scheduler 604 then determines whether any additional multi-RAT MU-MIMO pairings can be made and, if so, updates its own scheduling and again sends information back to the RAT B scheduler 606. This iteration may be repeated a desired number of times (e.g., once, twice, etc.) or until some stopping criterion is met (e.g., stop when no new multi-RAT MU-MIMO pairings can be made).

Again, note that the examples of FIGS. 4 through 7 are only examples. Further, the architectures illustrated in FIGS. 4 and 6 are only examples. The present disclosure is not limited to these examples. For example, in the discussion above, the RAT A system 402/600 and the RAT B system 404/602 share the same radio unit(s) or have separate radio units that are (physically) collocated. However, in other embodiments, the RAT A system 402/600 and the RAT B system 404/602 have separate radio units that are not collocated but may, for example, be quasi-collocated (i.e., properties of the channel between a UE and the radio unit(s) of the RAT A system 402/600 can be inferred from the channel between the UE and the radio unit(s) of the RAT B system 404/600, and vice versa, even though they are in fact not collocated).

When the RAT A system 402/600 and the RAT B system 404/602 use separate radio units that are not collocated (e.g., are instead quasi-collocated), in some embodiments, the radio units of the RAT A system 402/600 and the radio units of the RAT B system 404/602 are tightly synchronized (e.g., precise calibration is performed across the radio units of both the RAT A system 402/600 and the RAT B system 404/602). Alternatively, in some embodiments, channel information is obtained for the UEs 112 for both RATs. Using the embodiment of FIGS. 4 and 5 as an example, steps 500 and 502 are modified such that the RAT A system 402 obtains channel information for the wireless channels between the radio unit(s) of the RAT A system 402 and each of the RAT A and RAT B UEs (e.g., for UE 1, UE 2, and UE 3 in FIG. 4) and provides this channel information to the multi-RAT scheduler 400. Likewise, steps 504 and 506 are modified such that the RAT B system 404 obtains channel information for the wireless channels between the radio unit(s) of the RAT B system 404 and each of the RAT A and RAT B UEs (e.g., for UE 1, UE 2, and UE 3 in FIG. 4) and provides this channel information to the multi-RAT scheduler 400. Then, in step 502, e.g., UE 1 and UE 2 are selected as a multi-RAT MIMO pairing as discussed above but also taking into consideration the cross-channel interference between the radio unit(s) of the RAT B system 404 and UE 1 and the cross-channel interference between the radio unit(s) of the RAT A system 402 and UE 2. The pairing would be selected only if the cross-channel interference is manageable and the multi-RAT MIMO pairing results in increased performance. In the same way, the embodiment of FIGS. 6 and 7 can be modified to accommodate the scenario where the RAT A system 600 and the RAT B system 602 use non-collocated (e.g., quasi-collocated) radio units. Specifically, steps 700, 704, and 706 can be modified such that the information provided in step 706 includes channel information obtained for UEs 112 (e.g., UE 2) that are on RAT B for wireless channels between those UEs 112 and the radio unit(s) of the RAT A system 600. Also, step 702 can be modified to also obtain channel information for UEs 112 (e.g., UE 1) that are on RAT A for wireless channels between those UEs 112 and the radio unit(s) of the RAT B system 602. Then, in step 708, this additional channel information is considered when identifying the multi-RAT MU-MIMO pairings such that, e.g., cross-channel interference is also considered when identifying the multi-RAT MU-MIMO pairings.

As another example variation, in some embodiments, the architecture is divided into an antenna far part and one or more antenna near parts. For example, a base station 102 may include an antenna far part that is remote from one or more antenna near parts. Most but not necessarily all of the L1 baseband processing is performed in the antenna far part, possibly collocated with functionality taking care of some of the upper layer processing (possibly in a central location allowing for pooling of hardware resources for baseband processing). The antenna near part(s), which may also be referred to as a radio unit(s), may perform some of the L1 baseband processing (e.g., precoding). The scheduling functionality (i.e., the functionality of the multi-RAT scheduler 400 or the RAT A and/or RAT B schedulers 604 and 606) is implemented at the antenna far part and the associated transmission/reception is performed by one or more corresponding radio units. Alternatively, the scheduling functionality of the RAT A and RAB B schedulers 604 and 606 may be implemented at separate antenna far parts.

Figure 8:
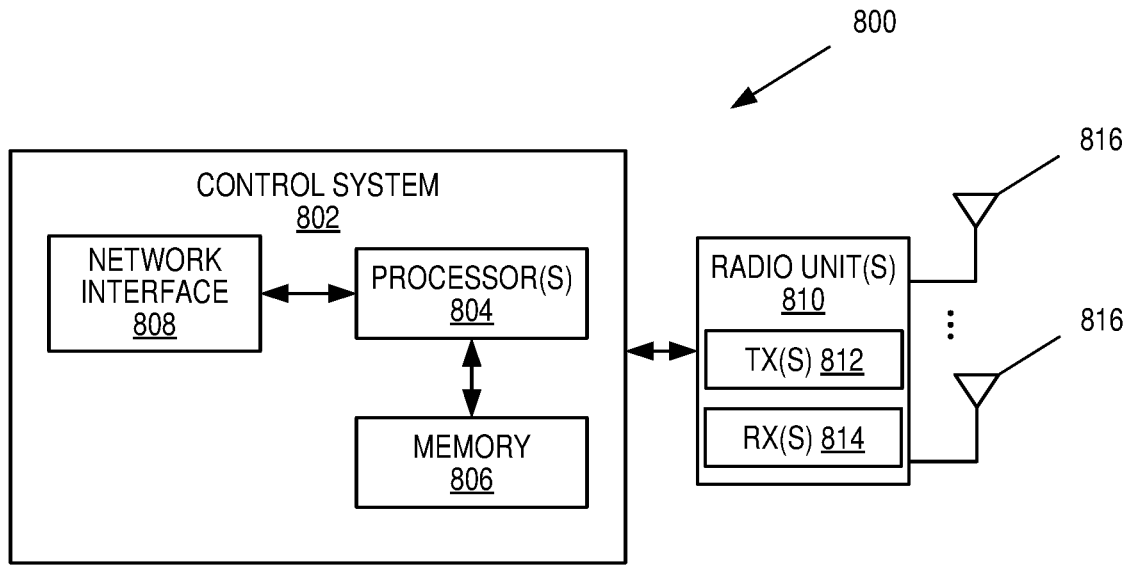
FIG. 8 is a schematic block diagram of a radio access node according to some embodiments of the present disclosure.
Figure 10:
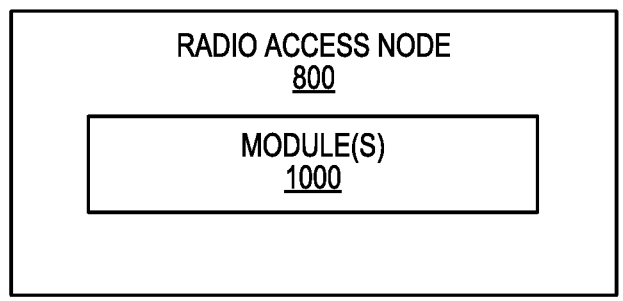
FIG. 10 is a schematic block diagram of the radio access node of FIG. 8 according to some other embodiments of the present disclosure.
Figure 9:
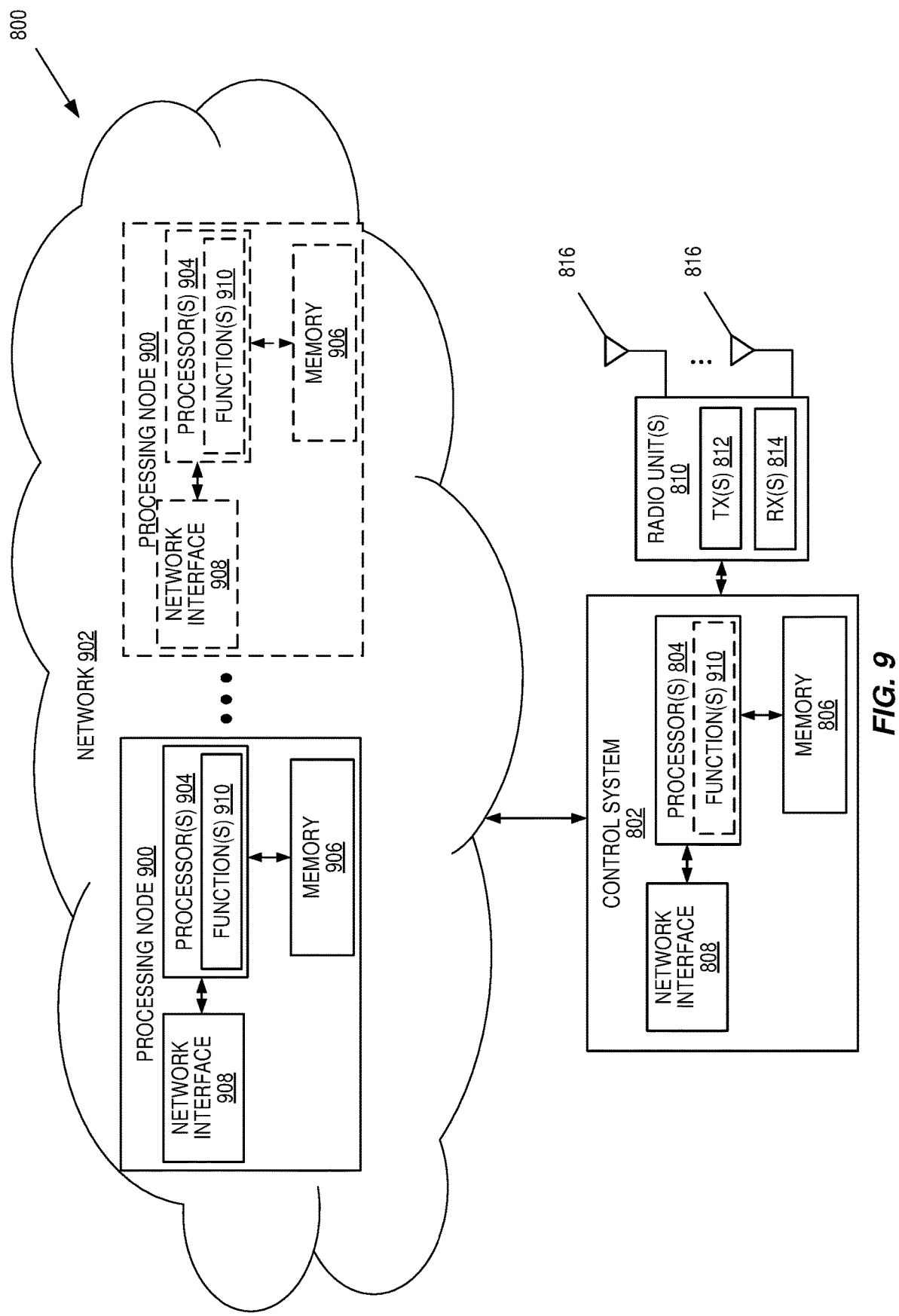
FIG. 9 is a schematic block diagram that illustrates a virtualized embodiment of the radio access node of FIG. 8 according to some embodiments of the present disclosure.

Along these lines, FIGS. 8 through 10 illustrate some example embodiments of a radio access node (e.g., a base station 102). In particular, FIG. 8 is a schematic block diagram of a radio access node 800 according to some embodiments of the present disclosure. The radio access node 800 may be, for example, a base station 102. As illustrated, the radio access node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. In addition, the radio access node 800 includes one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of a radio access node 800 (e.g., the functionality of the multi-RAT scheduler 400 or the RAT A/B scheduler 604/606) as described herein. In some embodiments, the function(s) are implemented in software that is stored, e.g., in the memory 806 and executed by the one or more processors 804.

FIG. 9 is a schematic block diagram that illustrates a virtualized embodiment of the radio access node 800 according to some embodiments of the present disclosure. This discussion is equally applicable to other types of network nodes. Further, other types of network nodes may have similar virtualized architectures.

As used herein, a "virtualized" radio access node is an implementation of the radio access node 800 in which at least a portion of the functionality of the radio access node 800 is implemented as a virtual component(s) (e.g., via a virtual machine(s) executing on a physical processing node(s) in a network(s)). As illustrated, in this example, the radio access node 800 includes the control system 802 that includes the one or more processors 804 (e.g., CPUs, ASICs, FPGAs, and/or the like), the memory 806, and the network interface 808 and the one or more radio units 810 that each includes the one or more transmitters 812 and the one or more receivers 814 coupled to the one or more antennas 816, as described above. The control system 802 is connected to the radio unit(s) 810 via, for example, an optical cable or the like. The control system 802 is connected to one or more processing nodes 900 coupled to or included as part of a network(s) 902 via the network interface 808. Each processing node 900 includes one or more processors 904 (e.g., CPUs, ASICs, FPGAs, and/or the like), memory 906, and a network interface 908.

In this example, functions 910 of the radio access node 800 described herein (e.g., the functionality of the multi-RAT scheduler 400 or the RAT A/B scheduler 604/606) are implemented at the one or more processing nodes 900 or distributed across the control system 802 and the one or more processing nodes 900 in any desired manner. In some particular embodiments, some or all of the functions 910 of the radio access node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicate directly with the processing node(s) 900 via an appropriate network interface(s).

In some embodiments, a computer program including instructions which, when executed by at least one processor, causes the at least one processor to carry out the functionality of radio access node 800 (e.g., the functionality of the multi-RAT scheduler 400 or the RAT A/B scheduler 604/606) or a node (e.g., a processing node 900) implementing one or more of the functions 910 of the radio access node 800 (e.g., the functionality of the multi-RAT scheduler 400 or the RAT A/B scheduler 604/606) in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

FIG. 10 is a schematic block diagram of the radio access node 800 according to some other embodiments of the present disclosure. The radio access node 800 includes one or more modules 1000, each of which is implemented in software. The module(s) 1000 provide the functionality of the radio access node 800 (e.g., the functionality of the multi-RAT scheduler 400 or the RAT A/B scheduler 604/606) described herein. This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AAS Advanced Antenna System
ASIC Application Specific Integrated Circuit
CPU Central Processing Unit
DSP Digital Signal Processor
eNB Enhanced or Evolved Node B
FDD Frequency Division Duplexing
FDMA Frequency Domain Multiple Access
FPGA Field Programmable Gate Array
gNB New Radio Base Station
GSM Global System for Mobile Communications
LTE Long Term Evolution
MIMO Multiple Input Multiple Output
MME Mobility Management Entity
MU-MIMO Multiple-User Multiple Input Multiple Output
NR New Radio
P-GW Packet Data Network Gateway
RAM Random Access Memory
RAT Radio Access Technology
ROM Read Only Memory
RRH Remote Radio Head
RRM Radio Resource Management
RX Receive
SCEF Service Capability Exposure Function
SDMA Spatial Domain Multiple Access
SU-MIMO Single-User Multiple Input Multiple Output
TDD Time Division Duplexing
TDMA Time Domain Multiple Access
TX Transmit
UE User Equipment Those skilled in the art will recognize improvements and modifications to the embodiments of the present disclosure. All such improvements and modifications are considered within the scope of the concepts disclosed herein.

What is claimed is:

1. A method of operation of a multi-Radio Access Technology, RAT, scheduler to schedule wireless communication devices in a wireless communication system that provides radio access via a first RAT and a second RAT, comprising:
obtaining, from a first RAT system, first information comprising:
channel information regarding channels between a first plurality of wireless communication devices and at least one radio unit used by the first RAT; or
scheduling information for the first RAT, the scheduling information comprising: (a) information that indicates one or more sets of time-frequency resources on which the first plurality of wireless communication devices are scheduled on the first RAT and (b) for each of the one or more sets of time-frequency resources, channel information regarding the channel between a respective wireless communication device scheduled on the set of time-frequency resources on the first RAT and the at least one radio unit used by the first RAT;
obtaining, from a second RAT system, second information comprising channel information regarding channels between a second plurality of wireless communication devices and at least one radio unit used by the second RAT; and jointly scheduling, at the multi-RAT scheduler, at least some of the first plurality of wireless communication devices on the first RAT and at least some of the second plurality of wireless communication devices on the second RAT based on the first information and the second information in such a manner that multi-RAT Multiple-User Multiple Input Multiple Output, MU-MIMO, pairings across the first and second RATs are considered, wherein jointly scheduling the at least some of the first plurality of wireless communication devices on the first RAT and the at least some of the second plurality of wireless communication devices on the second RAT comprises:
  identifying a multi-RAT MU-MIMO pairing comprising a first wireless communication device from among the first plurality of wireless communication devices and a second wireless communication device from among the second plurality of wireless communication devices based on the first information and the second information; and
  scheduling the at least some of the first plurality of wireless communication devices on the first RAT and the at least some of the second plurality of wireless communication devices on the second RAT such that the first wireless communication device and the second wireless communication device are scheduled on the same time-frequency resources using different spatial multiplexing layers on the first and second RATs, respectively.

2. The method of claim 1 wherein scheduling the at least some of the second plurality of wireless communication devices on the second RAT comprises scheduling the at least some of the second plurality of wireless communication devices on the second RAT based on the first information and the second information in such a manner that both:
  multi-RAT MU-MIMO pairings across the first and second RATs are considered; and
  multi-RAT Single-User Multiple Input Multiple Output, SU-MIMO, operation for a single wireless communication device across the first and second RATs is considered.

3. The method of claim 1 wherein, for each wireless communication device of the first plurality of wireless communication devices and the second plurality of wireless communication devices, the channel information for the wireless communication device comprises information that indicates an angular distribution of power of the channel between the wireless communication device and the at least one radio unit used by the respective RAT.

4. The method of claim 1 wherein, for each wireless communication device of the first plurality of wireless communication devices and the second plurality of wireless communication devices, the channel information for the wireless communication device comprises a channel estimate vector for the channel between the wireless communication device and at least one radio unit used by the respective RAT.

5. The method of claim 1 further comprising:
  obtaining, for each wireless communication device of the first plurality of wireless communication devices, first precoder information regarding a transmit or receive precoder used for the wireless communication device on the first RAT; and
  obtaining, for each wireless communication device of the second plurality of wireless communication devices, second precoder information regarding a transmit or receive precoder used for the wireless communication device on the second RAT;
  wherein scheduling the at least some of the second plurality of wireless communication devices on the second RAT comprises scheduling the at least some of the second plurality of wireless communication devices on the second RAT based on the first information, the second information, the first precoder information, and the second precoder information in such a manner that multi-RAT MU-MIMO pairings across the first and second RATs are considered.

6. A multi-Radio Access Technology, RAT, scheduler for scheduling wireless communication devices in a wireless communication system that provides radio access via a first RAT and a second RAT, the multi-RAT scheduler adapted to:
  obtain, from a first RAT system, first information comprising:
    channel information regarding channels between a first plurality of wireless communication devices and at least one radio unit used by the first RAT; or
    scheduling information for the first RAT, the scheduling information comprising: (a) information that indicates one or more sets of time-frequency resources on which the first plurality of wireless communication devices are scheduled on the first RAT and (b) for each of the one or more sets of time-frequency resources, channel information regarding the channel between a respective wireless communication device scheduled on the set of time-frequency resources on the first RAT and at least one radio unit used by the first RAT;
  obtain, from a second RAT system, second information comprising channel information regarding channels between a second plurality of wireless communication devices and at least one radio unit used by the second RAT; and
  jointly schedule, at the multi-RAT scheduler, at least some of the first plurality of wireless communication devices on the first RAT and at least some of the second plurality of wireless communication devices on the second RAT based on the first information and the second information in such a manner that multi-RAT Multiple-User Multiple Input Multiple Output, MU-MIMO, pairings across the first and second RATs are considered, wherein, in order to jointly schedule the at least some of the first plurality of wireless communication devices on the first RAT and the at least some of the second plurality of wireless communication devices on the second RAT, the multi-RAT scheduler is further adapted to:
    identify a multi-RAT MU-MIMO pairing comprising a first wireless communication device from among the first plurality of wireless communication devices and a second wireless communication device from among the second plurality of wireless communication devices based on the first information and the second information; and
    schedule the at least some of the first plurality of wireless communication devices on the first RAT and the at least some of the second plurality of wireless communication devices on the second RAT such that the first wireless communication device and the second wireless communication device are scheduled on the same time-frequency resources using different spatial multiplexing layers on the first and second RATs, respectively.

7. The multi-RAT scheduler of claim 6 wherein the multi-RAT scheduler is further adapted to:
provide first scheduling information to the first RAT system, the first scheduling information comprising information that indicates time-frequency resources scheduled for the at least some of the first plurality of wireless communication devices on the first RAT; and
provide second scheduling information to the second RAT system, the second scheduling information comprising information that indicates time-frequency resources scheduled for the at least some of the second plurality of wireless communication devices on the second RAT.

8. The multi-RAT scheduler of claim 6 wherein, in order to schedule the at least some of the second plurality of wireless communication devices on the second RAT, the multi-RAT scheduler is further adapted to schedule the at least some of the second plurality of wireless communication devices on the second RAT based on the first information and the second information in such a manner that both:
multi-RAT MU-MIMO pairings across the first and second RATs are considered; and
multi-RAT Single-User Multiple Input Multiple Output, SU-MIMO, operation for a single wireless communication device across the first and second RATs is considered.

9. The multi-RAT scheduler of claim 6 wherein, for each wireless communication device of the first plurality of wireless communication devices and the second plurality of wireless communication devices, the channel information for the wireless communication device comprises information that indicates an angular distribution of power of the channel between the wireless communication device and at least one radio unit used by the respective RAT.

10. The multi-RAT scheduler of claim 6 wherein, for each wireless communication device of the first plurality of wireless communication devices and the second plurality of wireless communication devices, the channel information for the wireless communication device comprises a channel estimate vector for the channel between the wireless communication device and at least one radio unit used by the respective RAT.

11. The multi-RAT scheduler of claim 6 wherein the multi-RAT scheduler is further adapted to:
obtain, for each wireless communication device of the first plurality of wireless communication devices, first precoder information regarding a transmit or receive precoder used for the wireless communication device on the first RAT; and
obtain, for each wireless communication device of the second plurality of wireless communication devices, second precoder information regarding a transmit or receive precoder used for the wireless communication device on the second RAT;
wherein, in order to schedule the at least some of the second plurality of wireless communication devices on the second RAT, the multi-RAT scheduler is further adapted to schedule the at least some of the second plurality of wireless communication devices on the second RAT based on the first information, the second information, the first precoder information, and the second precoder information in such a manner that multi-RAT MU-MIMO pairings across the first and second RATs are considered.

12. A network node that implements a multi-Radio Access Technology, RAT, scheduler for scheduling wireless communication devices in a wireless communication system that provides radio access via a first RAT and a second RAT, the network node comprising:
a network interface;
one or more processors; and
memory comprising instructions executable by the one or more processors whereby the network node is operable to:
obtain, from a first RAT system, first information comprising:
channel information regarding channels between a first plurality of wireless communication devices and at least one radio unit used by the first RAT; or
scheduling information for the first RAT, the scheduling information comprising: (a) information that indicates one or more sets of time-frequency resources on which the first plurality of wireless communication devices are scheduled on the first RAT and (b) for each of the one or more sets of time-frequency resources, channel information regarding the channel between a respective wireless communication device scheduled on the set of time-frequency resources on the first RAT and at least one radio unit used by the first RAT;
obtain, from a second RAT system, second information comprising channel information regarding channels between a second plurality of wireless communication devices and at least one radio unit used by the second RAT; and
jointly schedule, at the multi-RAT scheduler, at least some of the first plurality of wireless communication devices on the first RAT and at least some of the second plurality of wireless communication devices on the second RAT based on the first information and the second information in such a manner that multi-RAT Multiple-User Multiple Input Multiple Output, MU-MIMO, pairings across the first and second RATs are considered, wherein, in order to jointly schedule the at least some of the first plurality of wireless communication devices on the first RAT and the at least some of the second plurality of wireless communication devices on the second RAT, the network node is further operable to:
identify a multi-RAT MU-MIMO pairing comprising a first wireless communication device from among the first plurality of wireless communication devices and a second wireless communication device from among the second plurality of wireless communication devices based on the first information and the second information; and
schedule the at least some of the first plurality of wireless communication devices on the first RAT and the at least some of the second plurality of wireless communication devices on the second RAT such that the first wireless communication device and the second wireless communication device are scheduled on the same time-frequency resources using different spatial multiplexing layers on the first and second RATs, respectively.

* * * * *